United States Patent Office 3,782,964
Patented Jan. 1, 1974

3,782,964
METHOD OF UPGRADING STARCH-CONTAINING CRUDE GLUTEN
James W. Knight, Wilmslow, England, assignor to CPC International Inc.
No Drawing. Filed Jan. 21, 1969, Ser. No. 792,771
Int. Cl. A23j 3/00
U.S. Cl. 426—364
1 Claim

ABSTRACT OF THE DISCLOSURE

The present invention provides a process for rendering crude starch-containing gluten edible by subjecting the crude gluten to the hydrolytic action of alpha amylase to substantially hydrolyze the starch and introducing steam into the amylase treated gluten to heat the gluten to a temperature of at least 95° C. for several minutes. The hydrolyzed starch optionally may be removed in the aqueous fraction by filtration or like separation steps yielding an upgraded edible protein, or the mixture may be dried in its entirety by spray drying, roll-drum drying or the like.

---

The present invention relates to a process and the resulting product for preparing an edible protein-rich composition from starch-containing crude gluten obtained by wet milling of corn or grain sorghum.

When gluten is produced via the well-known wet milling process, it is generally unfit for inclusion in human foods. Its unsuitability is particularly related to bad odor and taste associated with the use of sulphur dioxide. Unfortunately, these properties are not eliminated or diminished sufficiently by washing or other similar simple methods. If an economical process were available for recovering an upgraded protein fraction from corn or grain sorghum gluten such method would be one of the cheapest sources of an edible protein.

It is therefore an object of the present invention to provide an economical process for rendering crude gluten edible.

It is another object of the invention to provide a simple process for eliminating the starch content of a crude gluten substance to yield a gluten containing substantial amounts of protein.

It is a still further object of the invention to provide a bland-tasting gluten edible protein product.

Yet another object is to provide an edible protein product from crude corn gluten, the edible product having an attractive malt taste and odor.

A further object of the invention is to provide an edible corn gluten product of excellent stability and storage life.

Other objects of the present invention will be apparent hereinafter from the following description and from the recitals of the appended claim.

The present invention provides a process for upgrading starch-containing gluten to obtain an edible protein-rich composition by (1) subjecting the crude gluten to the hydrolytic action of alpha amylase to hydrolyze the starch; and (2) introducing heat into the amylase-treated gluten to heat the gluten to a temperature of at least 95° C. for at least about 15 minutes.

It has been found that the objectionable odor and taste associated with starch-containing crude gluten are bound into the starch-protein structure. The well-known absorptive properties of starch also contribute to the retention of this odor and taste.

It has now been discovered that subjecting the crude gluten to the hydrolytic action of alpha amylase hydrolyzes the starch, disturbs the protein-starch structure, and frees the objectionable odor and taste bodies in such a manner that the taste and odor bodies are easily removed in the aqueous fraction; by subsequent heat treatment, preferably by steam distillation, and washing.

In a typical example, gluten cake from the string filters in a corn wet milling process is slurried to 13–14% solids and the pH adjusted to about 6. Alpha amylase is added in an appropriate amount and the mixture held at a temperature of about 80° C. for approximately one hour. Live steam is then introduced for a period of time of about one hour. The resulting product is filtered and the protein-rich filter cake is washed with warm water. After drying, the filter cake yields a high protein product having substantially no odor or taste.

Suitable crude glutens for treatment in accordance with the present invention include corn gluten and any other starch-containing crude gluten materials, such as sorghum gluten, which have been isolated in the presence of sulphur dioxide.

The initial steps, i.e. subjecting the crude gluten to the hydrolytic action of alpha amylase, may be accomplished by slurrying the crude gluten in water to provide a slurry having a solids content from about 10% or lower up to about 30%. The alpha amylase is added to the crude gluten prior to or subsequent to heating to a suitable temperature for action by the alpha amylase. Any enzyme can be used which liquefies or drastically alters the starch structure. Malt enzymes are an excellent alternative to alpha amylase.

The preferred enzyme used for the conversion of the starch in the crude gluten is the type commonly referred to in the art as alpha amylase. It is a starch liquefying, substantially heat-resistant hydrolytic alpha amylase. Suitable alpha amylases are derived from one of four sources. The sources are (1) pancreatic, (2) fungal, (3) bacterial, (4) salivary. Although alpha amylases from any one of these four sources is suitable for use in the present invention, for expediency and brevity, bacterial alpha amylases will be particularly exemplified.

Suitable bacterial alpha amylases may be produced by certain strains of Bacillus subtilus, Bacillus mesentericus, and the like by conventional fermentation methods. Kleistase, the proprietary name of a bacterial alpha amylase preparation produced and marketed by Daiwa Kasei, Japan, is an example of an enzyme preparation that is suitable for use in the present invention. Other suitable bacterial alpha amylases include Rhozyme H-39, manufactured and sold by Rohm & Haas, CPR-8 manufactured and sold by the Wallerstein Division of Baxter Laboratories, Inc., and HT-1000 manufactured and sold by Miles Chemical Laboratories.

The pH of the conversion medium, when using a bacterial alpha amylase, is preferably that which is suitable for the optimum atcivity of the alpha amylase. Generally, this pH range is between about 6.0 and about 8.0. The most suitable temperature range lies between the required for gelatinized starch which is at least about 60° C. and that at which the enzyme will lose a large portion of its activity which is about 95° C. It has been found that the preferred temperature range is between about 70° C. and about 92° C.

The quantity of the alpha amylase preparation required for hydrolyzing the starch will be dependent upon the activity of the alpha amylase preparation, the quantity of starch present in the crude gluten, the conversion temperature of the conversion medium, the pH of the medium, and the desired degree of hydrolysis of the starch present in the gluten. Suitable conditions are easily selected. For example, a bacterial alpha amylase preparation having an activity substantially equivalent to the HT-1000 product of Miles Chemical Laboratories would be used in an amount between about 0.001% and about 0.1% by weight of the crude gluten product on a dry basis. The conversion conditions would include a temperature of about 80° C. and a pH of about 6 for a period of time sufficient to hydrolyze the starch to the desired degree which generally will be about one hour.

When selecting a suitable alpha amylase, it is desirable to use one which is relatively low in proteolytic activity so as to avoid protein loss. The commercial enzyme preparations mentioned above derived from bacterial sources are sufficiently low in proteolytic activity to prevent substantial hydrolysis of the protein present. Most commercial bacterial alpha amylase preparations contain minute quantities of proteases having a proteolytic activity. It has been found, however, that the protease content is not sufficient to promote a significant degree of hydrolysis of the protein.

In addition to or in place of the alpha amylase, another starch hydrolyzing enzyme may be used. Examples of other suitable enzymes include glucamylase, diastase, malt and the like. When malt enzyme is used in place of, or in conjunction with another enzyme, the gluten product has a pleasant malty taste.

After treatment with one or more of the enzymes and when the desired degree of hydrolysis is obtained, the temperature is raised to at least 95° C. and preferably to a temperature from about 100° C. to about 150° C. for about 1 hour. Raising the temperature to a value above 95° C. is necessary to terminate the hydrolytic action of the enzyme and assists in improving filtration rates.

After the heat treatment which drives off the adverse odor and taste bodies by steam distillation or other heat methods suitable for driving off volatiles, the product may be subject to filtration, washing and drying to yield an edible protein-rich product having a moisture content less than about 15%.

Alternatively, the steam treated gluten may be passed to hot rolls to promote drying without removal of the hydrolyzed starch such that a product is yielded which contains maltodextrins and thus has an attractive malt taste and odor.

The invention will now be described in further detail by means of several exemplary demonstrations thereof. In each case all percentages are by weight and all temperatures in degrees centigrade.

EXAMPLE 1

The crude corn gluten cake used in this example had the following analysis:

| | |
|---|---|
| Moisture | 60%. |
| Protein | 70% d.b. |
| Starch | 80% d.b. |
| Reducing sugars | |
| Oil | 3.2% d.b. |
| Ash | 1.0% d.b. |
| pH | 4.3. |
| Crude fiber | 1.0. |
| Taste | Objectionable. |
| Odor | Objectionable. |

The crude gluten cake was slurried to 13–14% solids and the pH adjusted to 6 with soda ash. Bacterial alpha amylase, in this case the proprietary product Kleistase by Daiwa Kasei, Japan, was added to the slurry in a quantity of 0.005% based on total dry solids. The mixture was held at 80° C. for one hour to permit the alpha amylase to act on the starch.

After this time, the temperature was raised by the introduction of live steam to about 100° C. for a period of one hour. The resulting mixture was filtered hot through a plate and frame press and the protein washed with warm water. The filter cake was diluted to 80% water and dried in a spray drier and had the following analysis:

| | |
|---|---|
| Moisture | 5.8%. |
| Protein | 88.4% d.b. |
| Starch | Trace. |
| Reducing sugars | 0.53% d.b. |
| Oil | 4.5% d.b. |
| Ash | 0.54% d.b. |
| pH | 5.7. |
| Crude fiber | 0.8% d.b. |
| Taste | Bland, satisfactory. |
| Odor | Satisfactory. |

This product when tested was completely bland and had no adverse taste or odor. When subjected to shelf life storage tests for six months, the product showed no deterioration and was still substantially odorless and taste-free.

EXAMPLE 2

Crude corn gluten cake from South African white corn had approximately the following analysis:

| | |
|---|---|
| Moisture | 60%. |
| Protein | 71% d.b. |
| Starch | 18% d.b. |
| Reducing sugars | |
| Oil | 3.5% d.b. |
| Ash | 1.0% d.b. |
| pH | 4.4. |
| Crude fiber | 1.0%. |
| Taste | Objectionable. |
| Odor | Objectionable. |

The crude gluten cake was slurried to a solids content of about 20% and the pH adjusted to 6 with soda ash. Alpha amylase was added to the slurry at the rate of about 0.005% on total dry solids, and the mixture was held at 80° C. for about 1 hour. After this time the temperature was raised by the introduction of live steam to about 100° C. for a period of about one hour. After the steam treatment, the resulting mixture was filtered hot through a plate and frame press and the protein was washed with warm water. The washed filter cake was dried in a flash drier. The analysis of this product was as follows:

| | |
|---|---|
| Moisture | 6.2%. |
| Protein | 88.5% d.b. |
| Starch | 0.7% d.b. |
| Reducing sugars | |
| Oil | 4.9% d.b. |
| Ash | 0.4% d.b. |
| pH | 6.0. |
| Crude fiber | 0.4% d.b. |
| Taste | Bland, satisfactory. |
| Odor | Satisfactory. |

This product had a bland taste and no odor. Upon storage after about 4 months at room temperature the product still possessed the bland taste and freedom from odor, and showed no significant deterioration.

EXAMPLE 3

The enzyme treated product of Example 1 after the steam treatment was fed directly to hot rolls and dried in the form of a film. The dried product contained all solids including the hydrolyzed starch. After drying, the edible gluten was ground to a powder which exhibited a pleasant taste resulting from the maltodextrins present.

When malt enzyme was used in place of, or in conjunction with the alpha amylase of Example 1 and treated in accordance with this example, the resulting edible protein-rich composition had a pleasant malty taste.

EXAMPLE 4

The protein-rich composition obtained from the procedure of Example 1 is used to formulate a dietary biscuit product as follows:

|  | Grams |
|---|---|
| Protein-rich composition | 240 |
| White flour | 140 |
| Wholemeal flour | 140 |
| Sugar | 100 |
| Malt extract | 8 |
| Corn syrup | 15 |
| Corn oil | 56 |
| Margarine | 45 |
| Lard | 56 |
| Dried milk | 10 |

Minerals and vitamins added.

Pieces are formed from the dough and baked to produce a pleasant tasting biscuit of excellent texture and reduced calories.

In examples of other food uses, the protein-rich composition is used in the amount of about 2½% in fresh sausage as a binder or about 3% in cooked sausage. In each case the protein-rich composition lends good texture and binding to the sausage.

While the invention has been described in connection with specific embodiments thereof, it will be understood that the invention is capable of further modifications, and this application is intended to cover any variations, uses or adaptations of the invention following, in general, the principles of the invention and including such departures from the present disclosure as come within known or customary practice in the art to which the invention pertains and as may be applied to the essential features hereinbefore set forth and as fall within the scope of the invention.

I claim:

1. A process for upgrading starch-containing crude gluten, which gluten has been obtained as a by-product of the starch wet milling process, to obtain an edible protein-rich composition comprising:
    (1) subjecting the crude gluten to the hydrolytic action of bacterial alpha amylase to hydrolyze the starch;
    (2) subjecting the amylase-treated gluten to steam distillation for about 1 hour thereby substantially removing the odor and taste bodies;
    (3) filtering the steam distilled gluten to obtain a filtrate and a proteinaceous filter cake;
    (4) washing the proteinaceous filter cake with water; and
    (5) drying the proteinaceous filter cake to a moisture content less than about 15% to obtain a substantially dry edible protein-rich composition.

References Cited

UNITED STATES PATENTS

| 1,425,033 | 8/1922 | Moffatt | 99—17 |
| 2,583,684 | 1/1952 | Christensen | 195—4 |

A. LOUIS MONACELL, Primary Examiner

W. A. SIMONS, Assistant Examiner

U.S. Cl. X.R.

195—4, 31; 260—112 G